(12) United States Patent
Schmidt et al.

(10) Patent No.: US 12,090,804 B2
(45) Date of Patent: Sep. 17, 2024

(54) VEHICLE WHEEL SUSPENSION HAVING AN ADJUSTMENT SYSTEM FOR THE BASE OF A STRUCTURE SUPPORT SPRING

(71) Applicant: Bayerische Motoren Werke Aktiengesellschaft, Munich (DE)

(72) Inventors: Roland Schmidt, Stockdorf (DE); Serge Vos, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 709 days.

(21) Appl. No.: 17/256,079

(22) PCT Filed: Jun. 7, 2019

(86) PCT No.: PCT/EP2019/065036
§ 371 (c)(1),
(2) Date: Dec. 24, 2020

(87) PCT Pub. No.: WO2020/001962
PCT Pub. Date: Jan. 2, 2020

(65) Prior Publication Data
US 2021/0146739 A1    May 20, 2021

(30) Foreign Application Priority Data
Jun. 26, 2018    (DE) .................... 10 2018 210 403.4

(51) Int. Cl.
*B60G 11/14*    (2006.01)
*B60G 15/06*    (2006.01)
(Continued)

(52) U.S. Cl.
CPC ............ *B60G 11/14* (2013.01); *B60G 15/062* (2013.01); *B60G 17/021* (2013.01);
(Continued)

(58) Field of Classification Search
CPC .... B60G 11/14; B60G 15/062; B60G 17/021; B60G 17/044; B60G 2500/30;
(Continued)

(56) References Cited

U.S. PATENT DOCUMENTS

| 4,408,773 A | 10/1983 | Meller et al. |
| 4,993,693 A | 2/1991 | Loehr et al. |

(Continued)

FOREIGN PATENT DOCUMENTS

| CN | 104228509 A | 12/2014 |
| CN | 105377595 A | 3/2016 |

(Continued)

OTHER PUBLICATIONS

Translation of German Patent No. DE 102010014569 obtained on website: https://worldwide.espacenet.com on Jul. 3, 2023.*

(Continued)

*Primary Examiner* — Pamela Rodriguez
(74) *Attorney, Agent, or Firm* — Crowell & Moring LLP

(57) ABSTRACT

A vehicle wheel suspension has a hydraulic adjustment system for the base of a support spring provided between a wheel-guide component and the vehicle structure. The suspension includes a piston pump which is driven via a relative movement of the vehicle structure in relation to a wheel-guiding component and intended for conveying hydraulic medium through a return valve into a hydraulic chamber provided at the spring base, as well as a pressurized compensation volume for providing hydraulic medium. Preferably, the piston pump has a pump cylinder and a pump piston guided such that it can move relative to the former and a return channel connected to the hydraulic chamber feeds into the pump cylinder in such a way that the feed opening is blocked or released by the pump piston in a position-dependent manner, wherein hydraulic medium can flow via (Continued)

the released feed opening, out of the hydraulic chamber, through the pump cylinder and into the compensation volume.

8 Claims, 3 Drawing Sheets

(51) Int. Cl.
  *B60G 17/02*    (2006.01)
  *B60G 17/044*    (2006.01)
  *F16F 1/12*    (2006.01)

(52) U.S. Cl.
  CPC ............ *B60G 17/044* (2013.01); *F16F 1/121* (2013.01); *B60G 2202/12* (2013.01); *B60G 2202/312* (2013.01); *B60G 2500/22* (2013.01); *B60G 2500/30* (2013.01)

(58) Field of Classification Search
  CPC .......... B60G 2202/12; B60G 2202/312; B60G 2500/22; F16F 1/121
  See application file for complete search history.

(56) References Cited

U.S. PATENT DOCUMENTS

| | | | |
|---|---|---|---|
| 10,160,279 B2* | 12/2018 | Khaja | .................... B60G 11/14 |
| 2005/0199457 A1 | 9/2005 | Beck | |
| 2014/0367930 A1 | 12/2014 | Zeweke et al. | |
| 2015/0028551 A1 | 1/2015 | Reybrouck | |
| 2017/0282996 A1 | 10/2017 | Murakami et al. | |
| 2018/0141399 A1 | 5/2018 | Khaja et al. | |

FOREIGN PATENT DOCUMENTS

| | | |
|---|---|---|
| CN | 107416106 A | 12/2017 |
| CN | 108081897 A | 5/2018 |
| DE | 30 20 050 C2 | 11/1984 |
| DE | 38 16 102 C1 | 7/1989 |
| DE | 10 2004 011 632 B3 | 8/2005 |
| DE | 10 2009 058 027 A1 | 6/2011 |
| DE | 10 2010 014 569 B3 | 9/2011 |
| EP | 2 374 638 B1 | 1/2014 |
| EP | 3 225 436 A1 | 10/2017 |
| JP | 2001-182771 A | 7/2001 |

OTHER PUBLICATIONS

International Search Report (PCT/ISA/210) issued in PCT Application No. PCT/EP2019/065036 dated Sep. 18, 2019 with English translation (six (6) pages).

German-language Written Opinion (PCT/ISA/237) issued in PCT Application No. PCT/EP2019/065036 dated Sep. 18, 2019 (seven (7) pages).

German-language Search Report issued in German Application No. 10 2018 210 403.4 dated Feb. 27, 2019 with partial English translation (12 pages).

Chinese-language Office Action issued in Chinese Application No. 201980039992.X dated Apr. 24, 2023 with English translation (10 pages).

* cited by examiner

VEHICLE WHEEL SUSPENSION HAVING AN ADJUSTMENT SYSTEM FOR THE BASE OF A STRUCTURE SUPPORT SPRING

BACKGROUND AND SUMMARY OF THE INVENTION

The invention relates to a vehicle wheel suspension having a hydraulic adjustment system for the base of a support spring which is provided between a wheel-guiding component and the vehicle superstructure. Reference to the prior art is made by way of example to DE 38 16 102 C1 and DE 10 2009 058 027 A1.

The so-called spring-base adjustment of the support spring(s) provided between the superstructure of a vehicle and the wheel suspension(s) thereof is known in many different embodiments. The known systems, one of which is shown in the second document mentioned above, require externally provided energy, so to speak, at least for lifting the vehicle superstructure in relation to the wheel or the road surface, respectively, on which the vehicle is standing or traveling. Such lifting can be desirable or required in order to compensate for a load in order, in the case of a vehicle loaded with a great mass, to implement a normal ride height of the superstructure as would result in the case of a "normal" load, for example with only one or two occupants. After such a great additional mass has been unloaded, any desired lowering of the vehicle superstructure can then take place optionally without any external energy supply, specifically initiated by the weight of the vehicle superstructure.

The so-called self-pumping hydropneumatic suspension struts which have an internal level control system and do not require any external energy for lifting the vehicle superstructure are further known prior art, the first document mentioned at the outset showing an example thereof. Rather, the vehicle superstructure, on account of compression and rebound movements during the driving operation of the vehicle, pumps itself to a higher level, so to speak, in that the gas pressure in a gas-pressurized spring is hydraulically increased by the piston of a hydraulic damper. However, as a hydraulic pressure in the hydraulic damper is increased as a result of the aforegoing, the breakaway torque of the damper is also increased, this being at the expense of the ride comfort.

A spring-base adjustment which does not rely on the supply of external energy (=object of the present invention) is now to be demonstrated here.

This object is achieved by the features of the independent patent claim and lies in a vehicle wheel suspension having a hydraulic adjustment system for the base of a support spring which is provided between a wheel-guiding component and the vehicle superstructure, wherein a piston pump for conveying hydraulic medium through a check valve device into a hydraulic chamber provided at the spring base is provided, which piston pump is driven by way of a relative movement of the vehicle superstructure in relation to a wheel-guiding component, and which furthermore has a pressurized compensation volume for providing hydraulic medium. Advantageous configurations and refinements are the subject matter of the dependent claims.

According to the invention, the principle of the self-pumping suspension strut, which is known per se, is utilized, but without the damping behavior of a damper being negatively affected on account thereof. Rather, in a manner deviating from a self-pumping suspension strut, a spring-base adjustment (which is likewise known in principle) of the otherwise usual support spring takes place, the support spring potentially being configured as a steel coil spring or a steel helical spring, for example. To this end, a hydraulic cylinder, the effective length thereof being variable, is provided at one of the support points of the support spring, that is to say either between the support spring and the vehicle superstructure, or between the support spring and the or a, respectively, wheel-guiding element (for example a control arm). For example, a hollow cylinder of this hydraulic cylinder is connected directly or substantially directly, that is to say by way of an elastic mount, for example, to the vehicle superstructure, while the support spring is supported on an adjustment piston of this hydraulic cylinder. When this adjustment piston is displaced by supplying or discharging hydraulic medium to or from a hydraulic chamber of this hydraulic cylinder, the so-called spring base of the support spring is thus also displaced. A supply of hydraulic medium herein takes place with the aid of the piston pump which is provided according to the invention and which is operated by way of relative movements of the vehicle superstructure in relation to a wheel-guiding element of the vehicle wheel suspension.

To this end, the piston pump can have a pump cylinder and a pump piston which is guided so as to be displaceable in relation to the pump cylinder, wherein one of these two elements or component parts is connected fixedly or in a suitably articulated manner to the vehicle superstructure, and the other is connected fixedly or in a suitably articulated manner to a wheel-guiding element, for instance a wheel-guiding control arm, for example. As the vehicle superstructure is compressed in relation to the wheel, the pump piston is displaced into the pump cylinder on account of which a working chamber of this piston pump is reduced and hydraulic medium situated therein is compressed such that hydraulic medium by way of a check valve device of any type can ultimately reach the hydraulic chamber of the hydraulic cylinder for the adjustment of the spring base and act in a corresponding manner thereon. However, any significant lifting of the vehicle superstructure by the spring-base repositioning unit should only take place when this is actually necessary. In this sense, the present system, or a wheel suspension according to the invention, respectively, in one advantageous design embodiment can be configured so as to be self-regulating so to speak in such a manner that a return flow duct that is connected to the hydraulic chamber opens into the pump cylinder in such a manner that the port of this return flow duct is blocked or released as a function of the position of the pump piston, wherein hydraulic medium from the hydraulic chamber can preferably flow through the pump cylinder into the compensation volume by way of the released port. The pump piston which on a wheel-guiding control arm is supported so as to be articulated in such a manner, for example, that this pump piston by way of compression movements and rebound movements of the vehicle superstructure carries out an oscillating pump movement so to speak, and while interacting with the surrounding pump cylinder thus forms a control edge for releasing or blocking the return flow duct. In the case of a blocked return flow duct, the piston pump according to the invention conveys hydraulic medium into the hydraulic chamber of the spring-base repositioning unit, while the hydraulic medium in the case of an opened return flow duct can flow out of the hydraulic chamber mentioned. By way of a suitable disposal of the pump piston in relation to that wheel-guiding element which initiates an activation or displacement of the pump piston, the control edge mentioned can simultaneously operate as described and desired as a function of the position of this wheel-guiding element in relation to the vehicle superstructure. The same of course applies in the other case in which the pump piston is connected to the vehicle superstructure and the pump cylinder is connected to the wheel-guiding element.

In order for every short compression procedure and rebound procedure which is caused by road surface unevenness, in particular in the case of a vehicle with a normal or light load, not to cause a significant displacement or adjustment of the spring base that is temporally offset to the compression procedure and rebound procedure herein, a throttle location can be provided in the return flow duct mentioned. The flow of hydraulic medium through the return flow duct is significantly throttled on account thereof, which is why a displacement or repositioning of the spring base takes place only when the return flow duct is either opened or closed in an uninterrupted manner over a comparatively long period (longer than initiated by a road surface unevenness alone), at least in the case of a vehicle with a light load.

Two exemplary embodiments of the present invention will be described hereunder by means of detailed schematic sectional illustrations.

DETAILED DESCRIPTION OF THE DRAWINGS

Figure 1:
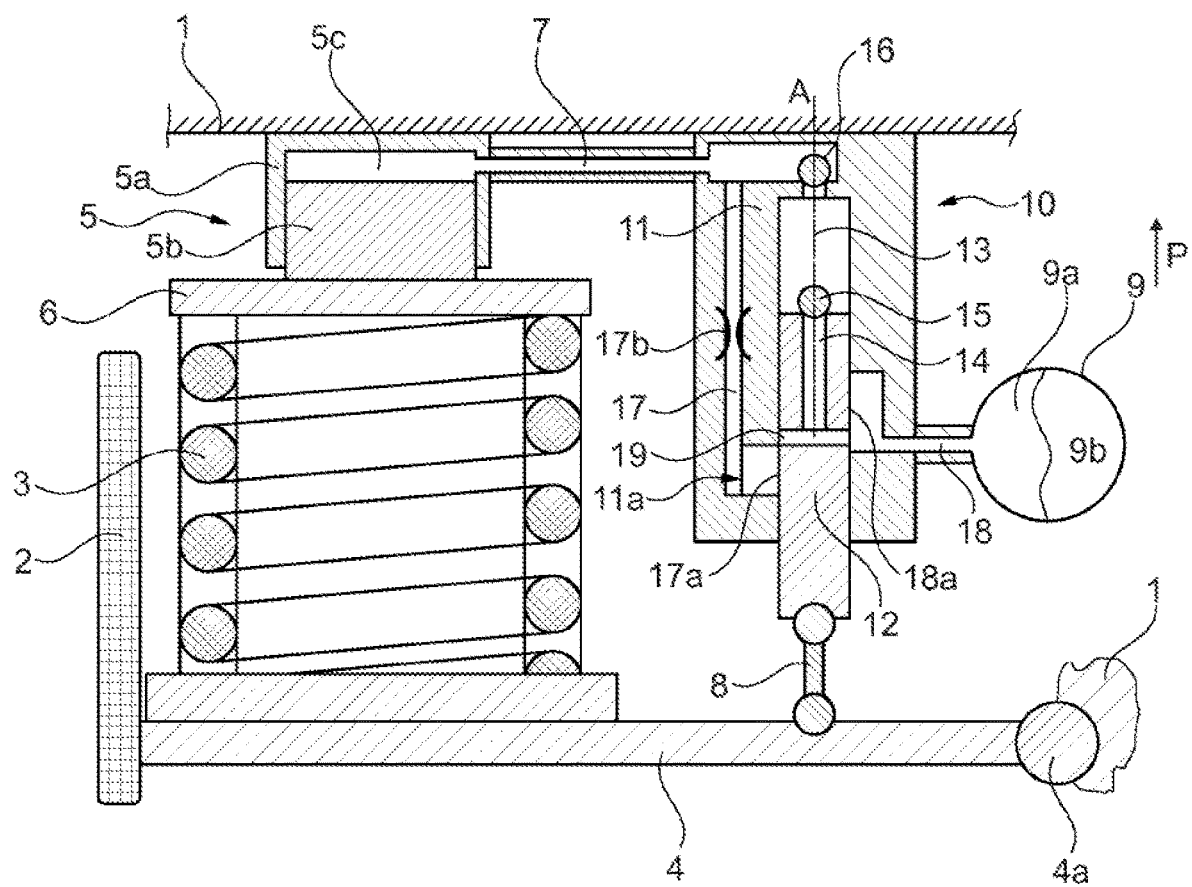
FIG. 1 is a detailed schematic sectional illustration of a first embodiment having a stand-alone piston pump.

First referring to FIG. 1, the superstructure of a vehicle, for example of a passenger motor vehicle, that is illustrated only by way of a fragment is identified with the reference sign 1, and a wheel of this two-axle double-track vehicle is identified with the reference sign 2. The vehicle superstructure 1 by way of a support spring 3 is supported on a wheel-guiding control arm 4 which is connected in a sufficiently articulated manner to the wheel 2, on the one hand, and is connected to the superstructure 1 at an articulation point 4a, on the other hand. A hydraulic cylinder 5, the (effective) length of which (in the vertical direction) being variable so as to enable a spring base displacement or adjustment in relation to the support spring 3, is provided herein between the vehicle superstructure 1 and the support spring 3. Specifically, a hollow cylinder 5a of the hydraulic cylinder 5 is fastened to the vehicle superstructure 1, and an adjustment piston 5b is provided in this hollow cylinder 5a which is open toward the road surface, that is to say toward the bottom, so to speak, the support spring 3 being supported on the free end of the adjustment piston 5b (here by way of a spring plate 6), while the adjustment piston 5b by way of the other end thereof, conjointly with the hollow cylinder 5a, delimits a hydraulic chamber 5c which is provided in this hollow cylinder 5a.

The hydraulic chamber 5c of the hydraulic cylinder 5 by way of a hydraulic line 7 is connected to a piston pump which in its entirety is identified by the reference sign 10 and which can convey a hydraulic medium into the hydraulic chamber 5c and which in the present exemplary embodiment advantageously also controls whether or not hydraulic medium is discharged from the hydraulic chamber 5c. The latter does however not represent a mandatory feature. In detail, the piston pump 10 is composed substantially of a pump cylinder 11 and a pump piston 12 which is guided so as to be displaceable in the pump cylinder 11. The pump cylinder 11 is fastened to the vehicle superstructure 1, and the pump piston 12 by way of a coupling rod 8 is connected to the wheel-guiding control arm 4.

The pump cylinder 11 and the pump piston 12 enclose a pressurized chamber 13. A duct 14 which by way of a first check valve 15 is connected to the pressurized chamber 13 runs within the pump piston 12. The pressurized chamber 13 by way of a further check valve 16 is connected to the hydraulic line 7 already mentioned. Return flow duct 17 which here runs within the housing of the pump cylinder 11 branches off from this hydraulic line 7, the port 17a of this return flow duct 17 that lies opposite this branch opening into a hollow-cylindrical portion 11a of the pump cylinder 11 in which (hollow-cylindrical portion 11a) the pump piston 12 is guided. A port 18a of a further duct 18, the other end of the latter being connected to a compensation volume 9a for hydraulic medium, lies opposite the port 17a in terms of the axis A of this hollow-cylindrical portion 11a but so as to be at another height when measured along the axis A. This compensation volume 9a is situated in a compensation vessel 9 and is pressurized by a gas pressure volume 9b. The pump piston 12 is finally traversed by a so-called control duct 19 from which the duct 14 which by way of the check valve 15 opens into the pressurized chamber 13 branches off. The port 17a as well as the port 18a are enlarged in relation to the diameter of the respectively associated duct 17 or 18, respectively, specifically only in the vertical direction but not in the circumferential direction of the pump cylinder 11 which has a circular cross-section. As has already been mentioned, the two ports 17a, 18a, when viewed in the direction of the cylinder axis A or in the vertical direction, respectively, for functional reasons furthermore lie at different heights, this yet to be discussed hereunder. The term "vertical direction" herein relates to the installed situation in the vehicle; this vertical direction in the illustration of the figures is represented by the vertical axis of a Cartesian coordinate system which lies in the drawing plane. The terms "top" and "bottom" herein apply to the installed situation as well as to the drawing.

The functional mode of this adjustment system for the base of the support spring 3, and more specifically of the piston pump 10 of this adjustment system, is as follows: When the vehicle superstructure 1 is loaded with a great mass, or more specifically while the vehicle superstructure 1 is being loaded with a great mass, this vehicle superstructure 1 is compressed further (downward) than in the case of a usual load having only the driver and a passenger, for example. This strong compression causes the control arm 4 to be displaced or pivoted about the articulation point 4a in such a manner that the pump piston 12, proceeding from the position illustrated in the figure, is displaced by a certain extent upward in the vertical direction according to the direction of the arrow P. By way of such a displacement of the pump piston 12, the control duct 19 lies further above the port 17a than is shown in the figure, and herein still remains in the region of the port 18a of the duct 18, the port 18a in the vertical direction being enlarged in relation to the duct diameter, as can be seen. By way of this movement according to the arrow P, the pump piston 12 displaces hydraulic medium from the pressurized chamber 13 through the second check valve 16, which is opened herein, into the hydraulic line 7 and, since the port 17a is closed, further into the hydraulic chamber 5c of the hydraulic cylinder 5. Consequently, the vehicle superstructure 1 is slightly lifted (according to the direction of the arrow P). This slight lifting of the vehicle superstructure 1 now causes the control arm 4 to be pivoted counter to the previously mentioned pivoting of this control arm 4 such that the pump piston 12 is slightly displaced downward counter to the direction of the arrow P, but (initially) not to the extent that the port 17a would be opened. As a result of this displacement of the pump piston 12, the hydraulic pressure in the pressurized chamber 13 is reduced and, under the effect of the gas pressure volume 9b on account of the first check valve 15 which is then opened, further hydraulic medium from the compensation vessel 9 reaches the pressurized chamber 13. All this advantageously takes place in a self-acting manner without any auxiliary energy when loading the vehicle, and without the vehicle electrical system having to be put in operation.

When the vehicle superstructure 1 in the subsequent driving operation of the vehicle under the effect of road surface unevenness is compressed counter to the direction of the arrow P, the process described in the preceding paragraph is repeated, and the vehicle superstructure is lifted somewhat further (according to the direction of the arrow P). However, it may readily arise that the pump piston 12 during a rebound of the vehicle superstructure 1 following compression due to the road surface is displaced downward, counter to the direction of the arrow P, so far that the port 17a is opened and consequently hydraulic medium from the hydraulic chamber 5c of the hydraulic cylinder 5 ultimately flows through the return flow duct 17 into the compensation vessel 9. In principle, this takes place until the port 17a is closed again by virtue of the consequential lowering of the vehicle superstructure 1. In order to prevent a large quantity of hydraulic medium flowing out of the hydraulic chamber 5c in the case of a still opened port 17a, a throttle 17b is provided in the return flow duct 17. This throttle 17 acts in the manner of a low-pass filter until the pump piston 12 by virtue of the already mentioned compression movement of the vehicle superstructure 1 (by reducing the quantity of hydraulic medium in the hydraulic chamber 5c) closes the port 17a.

The vehicle superstructure 1 will have reached the nominal ride height thereof above the road surface, that is to say that the vehicle superstructure 1 has been lifted to the extent that the compression travel previously caused by the load of a great mass has been compensated for by the displacement of the spring base or the support point of the support spring 5 on the spring plate 6 or the hydraulic cylinder 5, respectively, after the previously described process has been repeated multiple times, specifically the process of the vehicle superstructure 1 compressing and rebounding due to road surface unevenness, for example, with a corresponding supply or discharge of hydraulic medium to or from the hydraulic chamber 5c of the hydraulic cylinder 5. The initial state illustrated in FIG. 1 is thus reinstated. The port 17a of the return flow duct 17 is now opened with each further upward rebound procedure of the vehicle superstructure 1 according to the direction of the arrow P such that a specific quantity of hydraulic medium from the hydraulic cylinder 5 reaches the control duct 19 of the pump piston 12, and from this control duct 19 furthermore reaches the ducts 14 and 18, and thus also the compensation volume 9a of the compensation vessel 9. Since some of the hydraulic medium reaches the hydraulic cylinder 5 again during a subsequent compression of the superstructure 1 due to the road surface, an equilibrium with the control edge mentioned prior to the description of the figures is ultimately established, the control edge being formed by the control duct 19 in the pump piston 12 in interaction with the port 17a.

Figure 2:
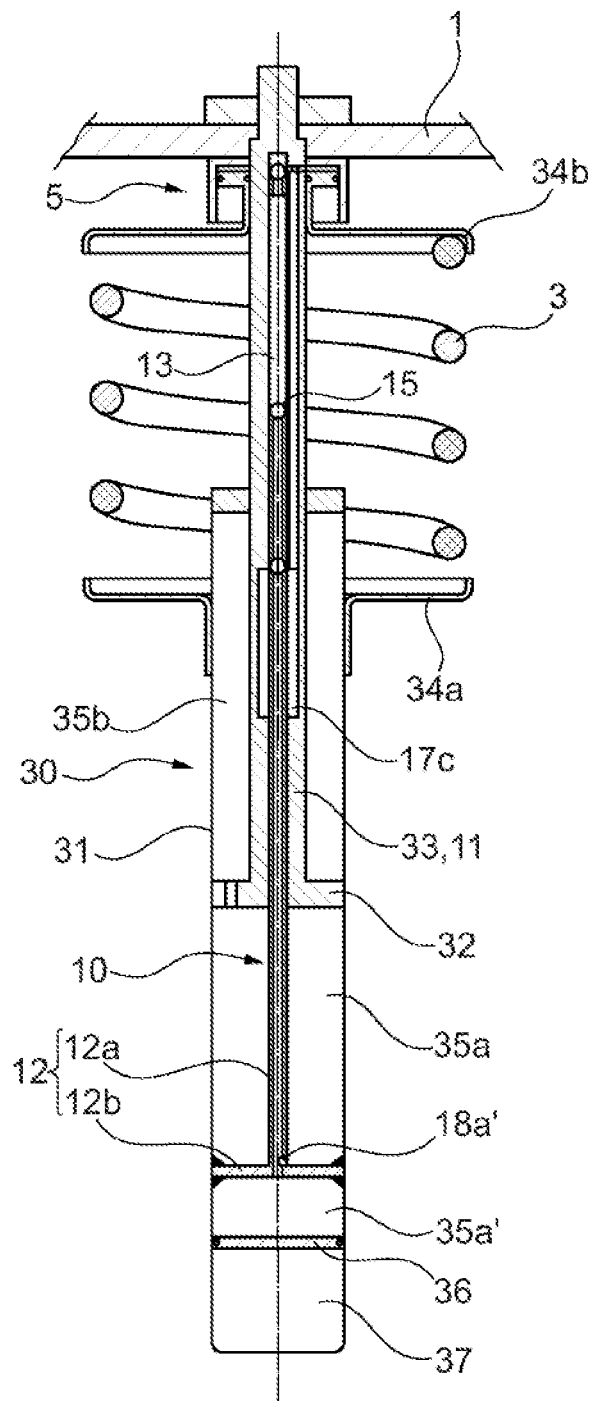
FIGS. 2, 2a show detailed schematic sectional illustrations of a second embodiment of a piston pump according to the invention (FIG. 2a being an enlarged fragment of FIG. 2) which is integrated in a hydraulic damper in the wheel suspension of a vehicle, for example a passenger motor vehicle.
Figure 2A:
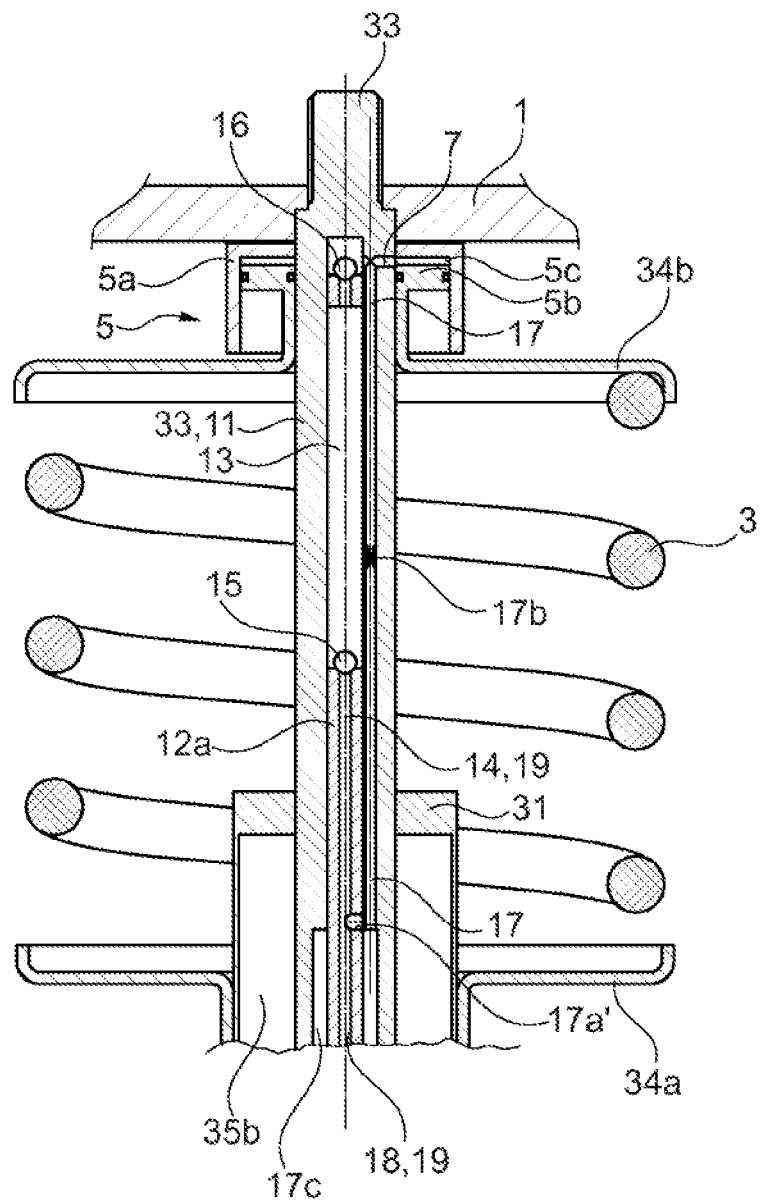

A further exemplary embodiment is shown in FIGS. 2, 2a, while the same reference signs are used for identical elements. Here, the piston pump 10 is integrated in an otherwise usual hydraulic damper 30 in the vehicle wheel suspension, the hydraulic damper 30 in functional terms being disposed in parallel with the support spring 3. As usual, this hydraulic damper 30 is firstly composed of a damper cylinder 31 and a damper piston 32 which is guided so as to be displaceable in the damper cylinder 31 and has a piston rod 33, the free upper end of the latter being fastened to the superstructure 1 of the vehicle. The damper cylinder 31 is supported on a wheel-guiding element of the vehicle and thus on the vehicle wheel (2—not shown), so to speak, at the lower end of the damper 30, this lower end being opposite this fastening on the vehicle superstructure 1.

The support spring 3 is clamped between two spring plates 34a, 34b, wherein the spring plate 34a that in the installed position is the lower spring plate 34a is fixedly connected to the external wall of the damper cylinder 31, while the upper spring plate 34b is fixedly connected to (a or) the adjustment piston 5b of (a or) the hydraulic cylinder 5 which by way of the hollow cylinder 5a here, in the direct environment of the fastening of the piston rod 33 to the vehicle superstructure 1, is supported on the vehicle superstructure 1 so as to surround the piston rod 33 in a concentric manner. The hydraulic chamber 5c of this hydraulic cylinder 5, and (a or) the hydraulic line 7 which (in a manner analogous to that of the exemplary embodiment according to FIG. 1) by way of (a or) the check valve 16 is connected to (a or) the pressurized chamber 13 of the piston pump 10 as well as to (a or) the return flow duct 17 of the piston pump 10, can be readily seen in particular in the enlarged illustration of FIG. 2a. By means of this figure it can thus be seen that the pump cylinder 11 of the piston pump 10 is formed by the piston rod 33 of the damper 30, the piston rod 33 being configured so as to be hollow.

Consequently, the pump piston 12, which is composed of a pump piston rod 12 and a pump piston plate 12b which is provided on the lower end of the pump piston rod 12, is also guided in the hollow piston rod 33 so as to be coaxial with the longitudinal axis of the latter. To this end, the pump piston rod 12 that is guided so as to be displaceable in the piston rod 33 traverses the damper piston 32 and thus protrudes into the lower damper chamber 35a which lies below the damper piston 32 and where the pump piston plate 12b is fastened to the internal wall of the damper cylinder 31, so that the pump piston 12 conjointly with the damper cylinder 31 is displaced in relation to the pump cylinder 11, the latter being fixed to the vehicle, when the wheel of the vehicle that is connected to the damper cylinder 31 is compressed or rebounds in relation to the superstructure 1 of the vehicle. In this context, for the sake of completeness, the usual upper damper chamber 35b which lies above the damper piston 32, as well as a separation piston 36 which acts in relation to a gas pressure volume 37 and is provided below the pump piston plate 12b (and so as to be spaced apart from the latter) in the lower damper chamber 35a, are also to be mentioned. The damper 30 presently is thus a usual single-tube damper, with the exception of the integrated piston pump 10.

Now discussing further the piston pump 10 of this second exemplary embodiment with reference to the above explanations pertaining to FIG. 1, the pressurized chamber 13 having the check valve 16 and the return flow duct 17 has already been explained. In a manner analogous to that of FIG. 1, a throttle 17b is provided in the return flow duct 17 also here in the second exemplary embodiment, and in the case of a suitable position of the pump piston 12 this return flow duct 17 (branching off from the hydraulic line 7) by way of a port 17a can open into a control duct 19 which here (in FIG. 2, 2a) runs within the pump piston rod 12a which is configured so as to be hollow. Deviating from FIG. 1, a so-called intermediate cavity 17c which surrounds the pump piston rod 12a is configured here in the piston rod 33 of the damper 30, the return flow duct 17 first opening into the intermediate cavity 17c before the control edge explained above comes to bear. This control edge here is formed by a passage bore 17a' (to the control duct 19) which is provided in the pump piston rod 12a of the pump piston 12, and by the end portion of the wall of the return flow duct 17 that faces the intermediate cavity 17c, the return flow duct 17 in turn being formed by the internal wall of the hollow piston rod 33 of the damper 30 that guides the pump piston rod 12a. It is to be mentioned here that the passage bore 17a' just mentioned in the pump piston rod 12a is identified by the reference sign 17a' because this passage bore 17a' is functionally equivalent to the port 17a according to FIG. 1.

In this second exemplary embodiment of the piston pump 10 (a or) the duct 14 which by way of (a or) the check valve 15 opens into the pressurized chamber 13 already mentioned is also provided, wherein the duct 14 here is an extension of the control duct 19, or coincides with the latter, respectively. The same applies in practical terms to the duct 18 (from FIG. 1) which in FIG. 2 in the form of the extended control duct 19, while penetrating the pump piston plate 12b in the lower damper chamber 35a presently opens into the region of the latter between the pump piston plate 12b and the separation piston 36, as well as by way of a further passage bore 18a' that is provided close to the pump piston plate 12b in the wall of the pump piston rod 12a opens into the region of the lower damper chamber 35a that lies between the pump piston plate 12b and the damper piston 32. It is to be mentioned here that the further passage bore 18a' just mentioned in the pump piston rod 12a is identified by the reference sign 18a' because this passage bore 18a' is functionally equivalent to the port 18a according to FIG. 1, wherein the same pressure conditions prevail in the lower damper chamber 35a and a so-called secondary chamber 35a' of this lower damper chamber 35a that lies between the pump piston plate 12b and the separation piston 36 by virtue of this passage bore 18a'. As can be seen, the lower damper chamber 35a having the secondary chamber 35a' in this exemplary embodiment according to FIG. 2, FIG. 2a, functions as a compensation vessel 9, or as a compensation volume 9a from FIG. 1, respectively, wherein the present (FIG. 2) gas pressure volume 37 is functionally equivalent to the above (FIG. 1) gas pressure volume 9b.

Of course, further embodiments for a piston pump 10 according to the invention in a vehicle wheel suspension are possible. For example, the piston pump 10 can thus be configured in a manner similar to that of FIG. 2, but the hydraulic cylinder 5 having the support spring 3 can be disposed remote from the damper 30, in a manner analogous to that of FIG. 1. Furthermore, instead of the check valves 15 and 16 mentioned here, which (deviating from the illustration in the figures) are moreover spring-loaded as usual, other suitable valves which can be designed so as to be also actuatable by an electronic control unit, for example, can also be provided. For this reason, mention is made of a check valve device in the patent claims, since potential other suitable valves can or should act respectively, in a manner comparable to that of a check valve. Furthermore, a particular advantage of an adjustment system according to the invention is to be mentioned, specifically that the hydraulic pressure required for lifting the vehicle superstructure 1, as opposed to the known hydropneumatic suspension struts, acts on the adjustment piston 5b of the, or a, hydraulic cylinder 5, the cross-sectional face of the latter being able to be designed so as to be significantly larger than is possible in the case of hydropneumatic suspension struts. The value of the hydraulic pressure can thus be correspondingly lower.

What is claimed is:

1. A vehicle wheel suspension having a hydraulic adjustment system for a spring base of a support spring, the support spring being provided between a wheel control arm and a vehicle superstructure, comprising:
    a piston pump for conveying hydraulic medium through a check valve device into a hydraulic chamber provided at the spring base, wherein
    the piston pump is driven by way of a relative movement of the vehicle superstructure in relation to the wheel control arm, and a pressurized compensation volume for providing the hydraulic medium, wherein
        a first end of the piston pump is connected to the vehicle superstructure and a second end of the piston pump, that is opposite to the first end, is connected to the wheel control arm.

2. The vehicle wheel suspension according to claim 1, wherein
    the piston pump has a pump cylinder and a pump piston which is guided so as to be displaceable in relation to the pump cylinder,
    a return flow duct that is connected to the hydraulic chamber opens into the pump cylinder such that a port of the return flow duct is blocked or released as a function of a position of the pump piston, and
    the hydraulic medium from the hydraulic chamber is flowable through the pump cylinder into the compensation volume by way of the released port of the return flow duct.

3. The vehicle wheel suspension according to claim 2, further comprising:
    a throttle located in the return flow duct.

4. The vehicle wheel suspension according to claim 1, wherein the check valve device comprises:
    a first check valve to a pressurized chamber provided in the pump cylinder, and
    a second check valve provided in a hydraulic line that leads from the pressurized chamber to the hydraulic chamber provided at the spring base.

5. The vehicle wheel suspension according to claim 1, wherein
    the hydraulic chamber that is provided at the spring base is situated in a hydraulic cylinder which is formed by a hollow cylinder and an adjustment piston.

6. The vehicle wheel suspension according to claim 1, wherein the pressurized compensation volume is situated in a compensation vessel and is pressurized by a gas pressure volume.

7. The vehicle wheel suspension according to claim 1, wherein a flow axis of the hydraulic chamber is perpendicular to motion axis of the piston pump.

8. The vehicle wheel suspension according to claim 1, wherein the support spring is positioned between the vehicle wheel and the piston pump.

* * * * *